US00H002125H

(19) United States
(12) Statutory Invention Registration
Brundage et al.

(10) Reg. No.: US H2125 H
(43) Published: Oct. 4, 2005

(54) BLENDING OF ECONOMIC, ETHER FREE SUMMER GASOLINE

(75) Inventors: Scott R. Brundage, Richmond, CA (US); David A. Kohler, Oakland, CA (US)

(73) Assignee: Chevron U.S.A. Inc., PA (US)

(21) Appl. No.: 10/120,498

(22) Filed: Apr. 12, 2002

Related U.S. Application Data

(63) Continuation of application No. 09/603,900, filed on Jun. 26, 2000, now abandoned, and a continuation-in-part of application No. 09/240,060, filed on Jan. 29, 1999, now abandoned.

(51) Int. Cl.[7] ..... C10L 1/04
(52) U.S. Cl. ..... 208/16; 208/17
(58) Field of Search ..... 208/16, 17

(56) References Cited

U.S. PATENT DOCUMENTS

| | | | | |
|---|---|---|---|---|
| 2,894,896 | A | | 7/1959 | Housam et al. |
| 2,904,498 | A | | 9/1959 | Findlay |
| 2,939,832 | A | | 6/1960 | Spijker et al. |
| 3,071,535 | A | | 1/1963 | Condrasky et al. |
| 3,072,562 | A | | 1/1963 | Bowles |
| 3,172,834 | A | | 3/1965 | Kozlowski |
| 3,316,168 | A | | 4/1967 | Mernitz |
| 3,383,190 | A | | 5/1968 | Weber et al. |
| 3,385,680 | A | | 5/1968 | Feld et al. |
| 3,582,281 | A | | 6/1971 | Fenske et al. |
| 3,672,840 | A | | 6/1972 | Fenske et al. |
| 3,758,401 | A | | 9/1973 | Bridgeford et al. |
| 4,824,552 | A | | 4/1989 | Nagasawa et al. |
| 5,004,850 | A | | 4/1991 | Wilson |
| 5,093,533 | A | | 3/1992 | Wilson |
| 5,288,393 | A | | 2/1994 | Jessup et al. |
| H1305 | H | | 5/1994 | Townsend et al. |
| 5,401,280 | A | * | 3/1995 | Kaneko et al. ..... 44/449 |
| 5,593,567 | A | | 1/1997 | Jessup et al. |
| 5,653,866 | A | | 8/1997 | Jessup et al. |
| H1716 | H | | 4/1998 | Rapp et al. |
| 5,837,126 | A | | 11/1998 | Jessup et al. |
| 6,132,479 | A | * | 10/2000 | Welstand et al. ..... 44/300 |
| 6,383,236 | B1 | * | 5/2002 | Welstand et al. ..... 44/300 |

OTHER PUBLICATIONS

"An Overview of Unocal's Low Emission Gasoline Research Program", Jessup et al., International Congress & Exposition, Detroit, Michigan, Feb. 24–28, 1992.

* cited by examiner

*Primary Examiner*—M. Thomson
(74) *Attorney, Agent, or Firm*—Burns, Doane, Swecker & Mathis, L.L.P.

(57) ABSTRACT

Provided is a novel high octane summer gasoline composition which is substantially free of ethers, and in compliance with the California Predictive Model. The gasoline composition is suitable for use in the summer, i.e., having a Reid vapor pressure of 7.2 or less, and more preferably 7.0 or less. The method for blending the gasoline comprises blending streams from a refinery in a controlled manner to maintain compliance with the California Predictive Model.

41 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BLENDING OF ECONOMIC, ETHER FREE SUMMER GASOLINE

CROSS-REFERENCE TO RELATED APPLICATIONS

This application is a continuation of application Ser. No. 09/603,900, filed on Jun. 26, 2000, now abandoned and the present application is a continuation-in-part of U.S. Ser. No. 09/240,060, filed on Jan. 29, 1999, now abandoned.

BACKGROUND OF THE INVENTION

1. Field of the Invention

The present invention relates to fuels, particularly gasoline fuels which are substantially oxygenate free. More specifically, the present invention relates to a low-emission gasoline fuel which complies with the California Predictive Model, as well as ASTM D4814, and is also substantially oxygenate free.

2. Brief Description of the Prior Art

One of the major environmental problems confronting the United States and other countries is atmospheric pollution caused by the emission of pollutants in the exhaust gases and gasoline vapor emissions from gasoline fueled automobiles. This problem is especially acute in major metropolitan areas where atmospheric conditions and the great number of automobiles result in aggravated conditions. While vehicle emissions have been reduced substantially, air quality still needs improvement. The result has been that regulations have been passed to further reduce such emissions by controlling the composition of gasoline fuels. These specially formulated, low emission gasolines are often referred to as reformulated gasolines. California's very strict low emissions gasoline is often referred to as California Phase 2 or Phase 3 gasoline. In these gasolines, oxygen-containing hydrocarbons, or oxygenates, are often blended into the fuel.

Congress and regulatory authorities, such as CARB (the California Air Resources Board), have focused on setting specifications for low emissions, reformulated gasoline. The specifications, however, require the presence of oxygenates in gasoline sold in areas that are not in compliance with federal ambient air quality standards for ozone, and the degree of non-attainment is classified as severe, or extreme. Among the emissions which the reformulated gasoline is designed to reduce, are nitrogen oxides ($NO_x$), hydrocarbons (HC), and toxics (benzene, 1,3-butadiene, formaldehyde and acetaldehyde). A reduction in these emissions has been targeted due to their obvious impact upon the air we breathe and the environment in general.

Oxygenated gasoline is a mixture of conventional hydrocarbon-based gasoline and one or more oxygenates. Oxygenates are combustible liquids which are made up of carbon, hydrogen and oxygen. All the current oxygenates used in reformulated gasolines belong to one of two classes of organic molecules: alcohols and ethers. The Environmental Protection Agency regulates which oxygenates can be added to gasoline and in what amounts. The ether compounds are of particular concern environmentally.

The primary oxygen-containing compound employed in gasoline fuels today are methyl tertiary butyl ether (MTBE) and ethanol. While oxygen is in most cases required in reformulated gasolines to help effect low emissions and the presence of ethanol has become more important, the presence of ether compounds such as MTBE in gasoline fuels has begun to raise environmental concerns. For example, MTBE has been observed in drinking water reservoirs, and in a few instances, ground water in certain areas of California. As a result, the public is beginning to question the benefits and/or importance of having cleaner burning gasolines, if they simply pollute the environment in other ways. Furthermore, oxygenates such as ethers also have a lower thermal energy content than non-oxygenated hydrocarbons, and therefore reduce the fuel economy of gasoline fueled motor vehicles.

Thus, while some of the concerns with regard to gasoline fuels containing ether could be overcome by further safe handling procedures and the operation of present facilities to reduce the risk of any spills and leaks, there remains a growing public concern with regard to the use of ether compounds in gasoline fuels. In an effort to balance the need for lower emission gasolines and concerns about the use of ether compounds it, therefore, would be of great benefit to the industry if a cleaner burning gasoline without ethers could be made which complied with the requirements of the regulatory authorities (such as CARB). The availability of such a gasoline, which contained substantially no ethers, would allow the public to realize the environmental benefits of low emissions, yet ease the concern of potential contamination of ground waters, and the environment in general, with ether compounds such as MTBE. Of benefit to the industry would also be the economics of such a low emission gasoline which contained substantially no ether compounds.

Accordingly, it is an object of the present invention to provide a gasoline fuel, and a method of blending same, which can truly benefit the environment and continue to be suitable for use as a motor gasoline.

Yet another object of the present invention is to provide such a gasoline fuel, and method of blending same, which is specifically suitable for the summer season, and of particular value a high octane summer fuel, which offers considerable difficulties in blending.

It is another object of the present invention to provide a high octane summer gasoline fuel, and method of blending same, which provides good emissions, yet is substantially free of ether compounds.

It is yet another object of the present invention to provide an economic and commercially plausible method for blending such a summer gasoline fuel.

These and other objects of the present invention will become apparent upon a review of the following specification, the Figures of the Drawing, and the claims appended hereto.

SUMMARY OF THE INVENTION

In accordance with the foregoing objectives, there is provided by the present invention a method of blending a novel gasoline suitable for use in the summer months, i.e., having a Reid vapor pressure in the range of about 7.20 or less, and more preferably 7.00 or less, which has an octane (R+M)/2 of 90 or greater, and is substantially free of oxygenates. The method comprises blending streams from a refinery, while maintaining the blend substantially free of ether compounds, in a controlled manner to maintain compliance with the California Predictive Model. It is preferred that testing of the blended fuel occurs during blending for compliance with the California Predictive Model, with adjustments made in the blends based on the results of the testing to thereby maintain compliance with the California Predictive Model.

Among other factors, the present invention is based in part upon the recognition that the blending process of some or all of the gasoline-component streams of an oil refinery, can be controlled, while eliminating ether compounds, to successfully provide by an economic, continuous blending process a low-emission gasoline substantially free of ethers which is in compliance with the California Predictive Model. The difficulty arises in eliminating ethers, as a significant difference in blending is required in the absence of ethers to achieve the requisite octane rating and fluid vapor pressure while also meeting the California Predictive Model specifications. MTBE in particular is a high octane, low-boiling, moderate RVP component and its elimination presents considerable obstacles to successfully blending a high octane (90 or greater octane number (R+M)/2) summer gasoline. Yet, it has been discovered that appropriate blending can occur to provide a commercially economic, low-emission, high octane gasoline blend suitable for summer using the gasoline-component streams of a refinery. Such blending can also adapt for the subsequent addition of ethanol, where desired. Generally, testing on either a periodic or continuous basis of the blended streams, with subsequent adjustments in the blends based on the results of the testing, is employed in order to maintain compliance with the California Predictive Model. This is particularly preferred as the streams in a refinery can change in composition over time.

In another embodiment, the present invention provides one with a novel, high octane summer gasoline which is substantially ether free and is in compliance with the California Predictive Model. The compositions are preferably blended by the methods of the present invention, and most preferably contain low amounts of sulfur.

DETAILED DESCRIPTION OF THE INVENTION

Figure 1:
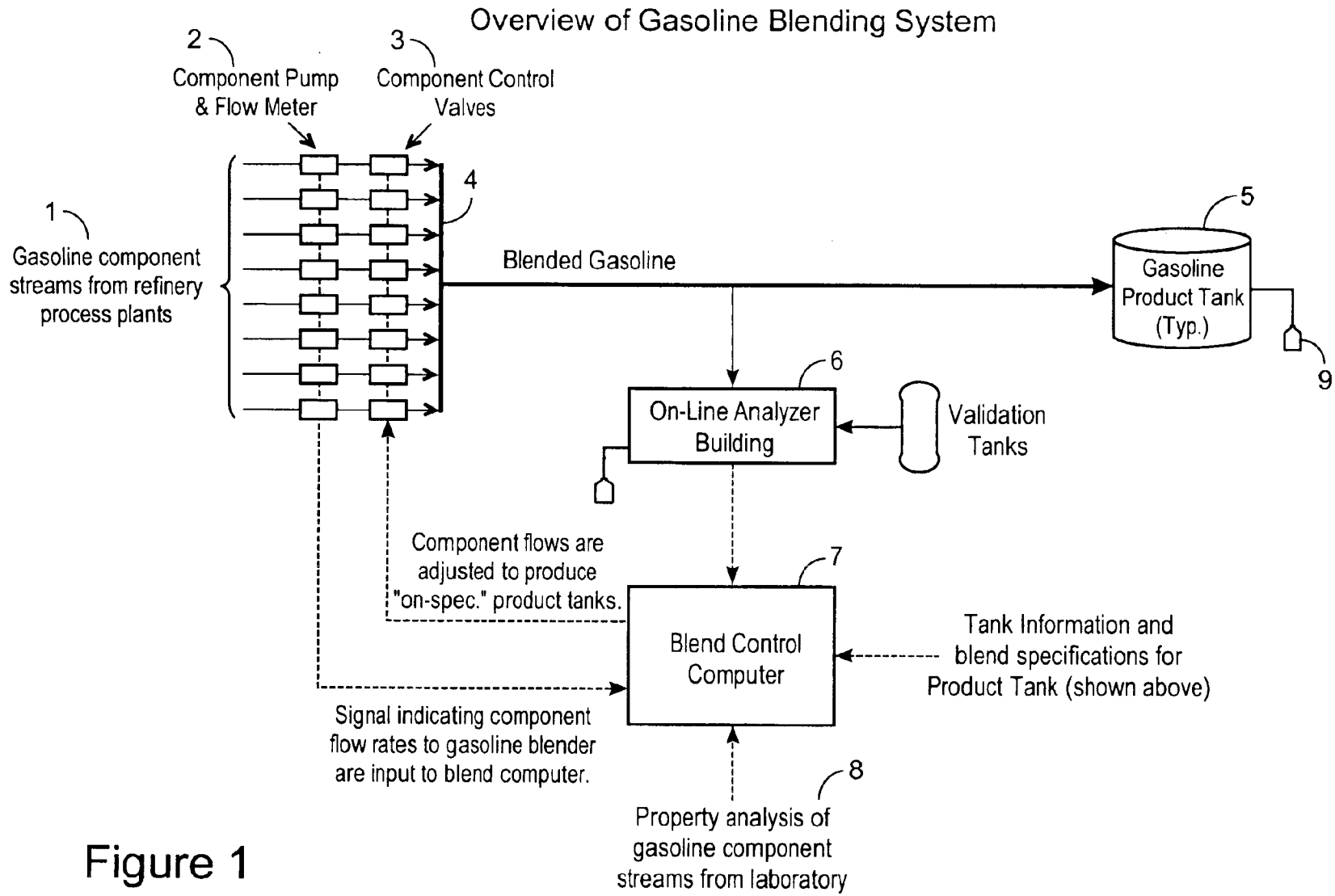
FIG. 1 of the drawing schematically depicts a gasoline blending system in accordance with the present invention.

Gasolines are well known fuels, generally composed of a mixture of numerous hydrocarbons having different boiling points at atmospheric pressure. Thus, a gasoline fuel boils or distills over a range of temperatures, unlike a pure compound. In general, a gasoline fuel will distill over the range of from about, room temperature to 437° F. (225° C.). This temperature range is approximate, of course, and the exact range will depend on the conditions that exist in the location where the automobile is driven. The distillation profile of the gasoline can also be altered by changing the mixture in order to focus on certain aspects of gasoline performance, depending on the time of year and geographic location in which the gasoline will be used.

Gasolines are therefore, typically composed of a hydrocarbon mixture containing aromatics, olefin, naphthenes and paraffins, with reformulated gasoline most often containing an oxygen compound, i.e., an ether such as methyl tertiary butyl ether. The fuels contemplated in the present invention are substantially oxygenate free unleaded gasolines (herein defined as containing a concentration of lead no greater than 0.05 gram of lead per gallon which is 0.013 gram of lead per liter). The anti-knock value (R+M)/2 for regular gasoline is generally at least 87, and for premium at least 91, and generally at least 92.

In an attempt to reduce harmful emissions upon the combustion of gasoline fuels, regulatory boards as well as Congress have developed certain specifications for reformulated gasolines. One such regulatory board is that of the State of California, i.e., the California Air Resources Board (CARB). In 1991, specifications were developed by CARB for California gasolines which, based upon testing, should provide good performance and low emissions. The specifications and properties of the reformulated gasoline, which is referred to as the Phase 2 reformulated gasoline or California Phase 2 gasoline, are shown in Table 1 below.

TABLE 1

Properties and Specifications for Phase 2 Reformulated Gasoline

| Fuel Property | Units | Flat Limit | Averaging Limit | Cap Limit |
|---|---|---|---|---|
| Reid vapor pressure (RVP) | psi, max. | 7.00[1] | | 7.00[1] |
| Sulfur (SUL) | ppmw | 40 | 30 | 80 |
| Benzene (BENZ) | vol. %, max. | 1.00 | 0.80 | 1.20 |
| Aromatic HC (AROM) | vol. %, max. | 25.0 | 22.0 | 30.0 |
| Olefin (OLEF) | vol. %, max. | 6.0 | 4.0 | 10.0 |
| Oxygen (OXY) | wt. % | 1.8 (min)<br>2.2 (max) | | 0 (min)<br>3.5 (max) |
| Temperature at 50% distilled (T50) | deg. F. | 210 | 200 | 220 |
| Temperature at 90% distilled (T90) | deg. F. | 300 | 290 | 330 |

[1]Applicable during the summer months identified in 13 CCR, sections 2262.1(a) and (b); California requires adherence to ASTM specifications.

Recently, Phase 3 regulations have been developed. At present, the gasoline can meet either Phase 2 or Phase 3 regulations, but beginning Jan. 1, 2003, Phase 3 regulations must be met. The specifications and properties of the reformulated California Phase 3 gasoline are shown in Table 2 below:

TABLE 2

Properties and Specifications for Phase 3 Reformulated Gasoline

| Fuel Property | Units | Flat Limit | Average Limit | Cap Limit |
|---|---|---|---|---|
| Reid vapor pressure (RVP) | psi, max. | 7.00 | | 6.40–7.20[1] |
| Sulfur (SUL) | ppmw | 20 | 15 | 60[2]/30[3] |
| Benzene (BENZ) | vol. %, max | 0.80 | 0.70 | 1.10 |
| Aromatic HC (AROM) | vol. %, max | 25.0 | 22.0 | 35.0 |
| Olefin (OLEF) | vol. %, max | 6.0 | 4.0 | 10.0 |
| Oxygen (OXY) | wt. % | 1.8 (min)<br>2.2 (max) | | 3.7[4] |
| Temperature at 50% distilled (T50) | deg. F. | 213 | 203 | 220 |
| Temperature at 90% distilled (T90) | deg. F. | 305 | 295 | 330 |

[1]Applicable during the summer months identified in 13 CCR, Sections 2262, 1(a) and (b); California requires adherence to ASTM specifications.
[2]Jan. 1, 2003–Dec. 31, 2004.
[3]Beginning Jan. 1, 2005.
[4]For ethanol only.

In Tables 1 and 2, as well as for the rest of the specification, the following definitions apply:

Aromatic hydrocarbon content (Aromatic HC, AROM) means the amount of aromatic hydrocarbons in the fuel expressed to the nearest tenth of a percent by volume in accordance with 13 CCR (California Code of Regulations), section 2263.

Benzene content (BENZ) means the amount of benzene contained in the fuel expressed to the nearest hundredth of a percent by volume in accordance with 13 CCR, section 2263. For the Phase 3 reformulated gasoline, an oxygen containing compound such as ethanol can be added for oxygen content, whereas ethers cannot. The present invention permits one to successfully and efficiently blend a gasoline which meets either the requirements for the Phase 2 or Phase 3 reformulated gasolines.

Olefin content (OLEF) means the amount of olefins in the fuel expressed to the nearest tenth of a percent by volume in accordance with 13 CCR, section 2263.

Oxygen content (OXY) means the amount of actual oxygen contained in the fuel expressed to the nearest tenth of a percent by weight in accordance with 13 CCR, section 2263.

Potency-weighted toxics (PWT) means the mass exhaust emissions of benzene, 1,3-butadiene, formaldehyde, and acetaldehyde, each multiplied by their relative potencies with respect to 1,3-butadiene, which has a value of 1.

Predictive model means a set of equations that relate emissions performance based on the properties of a particular gasoline formulation to the emissions performance of an appropriate baseline fuel.

Reid vapor pressure (RVP) means the vapor pressure of the fuel expressed to the nearest hundredth of a pound per square inch in accordance with 13 CCR, section 2263.

Sulfur content (SUL) means the amount by weight of sulfur contained in the fuel expressed to the nearest part per million in accordance with 13 CCR, section 2263.

50% distillation temperature (T50) means the temperature at which 50% of the fuel evaporates expressed to the nearest degree Fahrenheit in accordance with 13 CCR, section 2263.

90% distillation temperature (T90) means the temperature at which 90% of the fuel evaporates expressed to the nearest degree Fahrenheit in accordance with 13 CCR, section 2263.

Toxic air contaminants means exhaust emissions of benzene, 1,3-butadiene, formaldehyde, and acetaldehyde.

The pollutants addressed by the foregoing specifications include oxides of nitrogen ($NO_x$), and hydrocarbons (HC), which are generally measured in units of gm/mile, and potency-weighted toxics (PWT), which are generally measured in units of mg/mile.

The California Phase 2 and Phase 3 reformulated gasoline regulations define a comprehensive set of specifications for gasoline (Tables 1 and 2). These specifications have been designed to achieve large reductions in emissions of criteria and toxic air contaminants from gasoline-fueled vehicles. Gasolines which do not meet the specifications are believed to be inferior with regard to the emissions which result from their use in vehicles. All gasolines sold in California, beginning Jun. 1, 1996, have had to meet CARB's Phase 2 requirements as described below, and Phase 3 regulations begin Jan. 1, 2003. The specifications address the following eight gasoline properties:

Reid vapor pressure (RVP)

Sulfur

Oxygen

Aromatic hydrocarbons

Benzene

Olefins

Temperature at which 90 percent of the fuel has evaporated (T90)

Temperature at which 50 percent of the fuel has evaporated (T50)

The Phase 2 and Phase 3 gasoline regulations include gasoline specifications that must be met at the time the gasoline is supplied from the production facility. Producers have the option of meeting either "flat" limits or, if available, "averaging" limits, or, alternatively a Predictive Model equivalent performance standard using either the "flat" or "averaging" approach.

The flat limits must not be exceeded in any gallon of gasoline leaving the production facility when using gallon compliance. For example, the aromatic content of gasoline, subject to the default flat limit, could not exceed 25 volume percent (see Tables 1 and 2).

The averaging limits for each fuel property established in the regulations are numerically more stringent than the comparable flat limits for that property. Under the averaging option, the producer may assign differing "designated alternative limits" (DALs) to different batches of gasoline being supplied from the production facility. Each batch of gasoline must meet the DAL assigned for the batch. In addition, a producer supplying a batch of gasoline with a DAL less stringent than the averaging limit must, within 90 days before or after,.supply from the same facility sufficient quantities of gasoline subject to more stringent DALs to fully offset the exceedances of the averaging limit. Therefore, an individual batch may not meet the California Phase 2 or Phase 3 Predictive Model when using averaging, but in aggregate, over time, they must.

The Phase 2 and Phase 3 gasoline regulations also contain "cap" limits. The cap limits are absolute limits that cannot be exceeded in any gallon of gasoline sold or supplied throughout the gasoline distribution system. These cap limits are of particular importance when the California Predictive Model or averaging is used.

A mathematical model, the California Predictive Model, has also been developed by CARB to allow refiners more flexibility. Use of the predictive model is designed to allow producers to comply with the Phase 2 or Phase 3 gasoline requirements by producing gasoline to specifications different from either the averaging or flat limit specifications set forth in the regulations. However, producers must demonstrate that the alternative Phase 2 or Phase 3 gasoline specifications will result in equivalent or lower emissions compared to Phase 2 or Phase 3, respectively, gasoline meeting either the flat or averaging limits as indicated by the Predictive Model. Further, the cap limits must be met for all gasoline formulations, even alternative formulations allowed under the California Predictive Model. When the Predictive Model is used, the eight parameters of Tables 1 and 2 are limited to the cap limits.

In general, the California Predictive Model is a set of mathematical equations that allows one to compare the expected exhaust emissions performance of a gasoline with a particular set of fuel properties to the expected exhaust emissions performance of an appropriate gasoline fuel. One or more selected fuel properties can be changed when making this comparison.

Generally, in a predictive model, separate mathematical equations apply to different indicators. For example, a mathematical equation could be developed for an air pollutant such as hydrocarbons; or, a mathematical equation could be developed for a different air pollutant such as the oxides of nitrogen.

Generally, a predictive model for vehicle emissions is typically characterized by:

the number of mathematical equations developed, the number and type of motor vehicle emissions tests used in the development of the mathematical equations, and the mathematical or statistical approach used to analyze the results of the emissions tests.

The California Predictive Model is comprised of eighteen (18) mathematical equations. One set of six equations predicts emissions from vehicles in Technology Class 3 (model years 1981–1985), another set of six is for Technology Class 4(model years 1986–1995), and another set for Technology Class 5 (model years 1996–2005). For each technology class, one equation estimates the relative amount of exhaust emissions of hydrocarbons, the second estimates the relative amount of exhaust emissions of oxides of nitrogen, and four are used to estimate the relative amounts of exhaust emissions of the four toxic air contaminants: benzene, 1,3-butadiene, acetaldehyde, and formaldehyde. These toxic air contaminants are combined based on their relative potential to cause cancer, which is referred to as potency-weighting.

In creating the California Predictive Model, CARB compiled and analyzed the results of over 7,300 vehicle exhaust emissions tests. A standard statistical approach to develop the mathematical equations to estimate changes in exhaust emissions was used based upon the data collected. It is appreciated that the California Predictive Model might change with regard to certain of the components considered and their limits. In fact, at present, as discussed above, there exists a California Phase 2 Predictive Model and a California Phase 3 Predictive Model. However, it is believed that the present invention and its discovery that a blending process can be used to effectively create the gasolines of the present invention, can be used to blend a gasoline in compliance with the specifications of any California Predictive Model.

In summary, specific requirements were created by the California Air Resources Board to restrict the formulation of gasoline to ensure the production of gasoline which produces low emissions when used in automobiles. The present invention provides one with a method of blending a low emission, ether free gasoline economically and in a commercially plausible manner. The gasoline obtained is in compliance with the California Predictive Model, at present either the Phase 2 or Phase 3 Predictive Model, and it contains substantially no ether compounds. The gasoline is also in compliance with ASTM D4814. By substantially free of ethers, for the present invention, is meant that the amount of oxygen attributable to ethers is less than 0.5 wt. %, more preferably less than 0.1 wt. %, and most preferably less than 0.05 wt. % in the blended gasoline. It is also preferred that the gasoline of the present invention be low in sulfur content. It is most preferred that the sulfur content is less than 30 ppm wt., more preferably less than 25 ppm wt., even more preferably less than 20 ppm wt., and most preferably less than 10 ppm wt., and even 5 ppm wt. The amount of sulfur can be controlled by specifically choosing streams which are low in sulfur for blending in the gasoline.

The gasoline compositions of the present invention also preferably have a $T_{50}$ of less than 210° F., or preferably less than 200° F., and most preferably about 185° F. or less, when Phase 2 gasoline is being blended, and preferably less than 203° F., more preferably less than 200° F., and most preferably less than 190° F. when Phase 3 gasoline is being blended. The olefin content is also less than 8 vol. %, more preferably less than 6 vol. %, and most preferably less than 3 vol. %. The amount of benzene is also less than 0.5 vol. % in the most preferred embodiment.

As the gasoline of the present invention is designed for summer months, the RVP is generally lower. The RVP is generally less than 7.2, and more preferably less than 7.0 psi.

The gasoline of the present invention also has an octane rating of at least 90 (R+M)/2, more preferably at least 91, and most preferably at least 92, or 93 and greater.

In a preferred embodiment, the gasoline composition contains less than 0.1 wt. % oxygen attributable to ethers, and less than 20 ppm wt. sulfur, and more preferably less than 10 ppm wt. sulfur.

The method of the present invention comprises blending gasoline component streams from refinery process plants. Any of the conventional gasoline component streams which are blended into gasolines can be used.

A schematic of a suitable system is shown in FIG. 1 of the Drawing. The gasoline component streams are provided at 1, and flow through component pump and flow meters 2. Component control valves 3 control how much of each stream is let into the blending process 4, to create the blended gasoline. The blended gasoline is then generally stored in a gasoline product tank 5.

To begin the process, a blending model can be used to approximate the blending of the gasoline. Such blending models can be created via experience of blending gasolines in compliance with the California Predictive Model. They help to predict compliance with a California Predictive Model and are important tools in beginning the process. It is generally important, however, to include an analysis of the blended gasoline to maintain compliance of the California Predictive Model. Such testing can be periodic or continuous. In general, it is preferred to use an on-line analyzer as shown at 6. Generally, the analysis run involves the entire boiling range of the gasoline, including $T_{50}$ and $T_{90}$, the RVP of the blended gasoline, the benzene/aromatics content, the olefins content, the ether content and the sulfur content. The tests run can be as follows:

For distillation, the analyzer utilizes an Applied Automation Simulated Distillation Motor Gasoline Gas Chromatograph. This analyzer is similar to the instrument described in ASTM D 3710-95: Boiling Range Distribution of Gasoline by Gas Chromatography. This test method is designed to measure the entire boiling range of gasoline, either high or low Reid Vapor Pressures, and has been validated for gasolines containing the oxygenates methyl tertiary butyl ether (MTBE) and tertiary amyl methyl ether (TAME). Alternatively, the ASTM D86 distillation method can be used, although not preferred for an on-line analyzer. Either test can be run.

Measuring RVP utilizes an ABB Model 4100 Reid Vapor Pressure Analyzer. This analyzer is described in ASTM D 5482-96. This is a substitute for the "CARB RVP" calculation based on the Dry-Vapor Pressure result from D5191, which is itself a substitute for ASTM method 393-89. Either can be used.

The method for measuring benzene and aromatic content can utilize the Applied Automation Standard Test Method for Determination of Benzene, Toluene, C8 and Heavier Aromatics, and Total Aromatics in Finished Motor Gasoline Gas Chromatograph. The analyzer is similar to the instrument described in ASTM D 5580-95: Standard Tests Method for Determination of Benzene, Toluene, Ethylbezene, p/m-Xylene, C9 and Heavier Aromatics, and Total Aromatics in Finished Gasoline by Gas Chromatography. This is substitute for ASTM D5580 and ASTM D 1319 (for aromatics) and ASTM D3606 (for benzene) methods which methods can also be used.

Olefin content can be measured using any suitable method. ASTM D1319 is presently preferred. Other methods can also be used.

For ethers, the method utilizes an Applied Automation Oxygenate Gas Chromatograph. The method is designed to quantify the amount of methyl tertiary butyl ether (MTBE), ethyl tertiary butyl ether (ETBE), and tertiary amyl methyl ether (TAME) in a hydrocarbon matrix. This is a substitute for ASTM D4815 distillation method, which can also be used.

For measurement of sulfur content, the analyzer can utilize an ABB Model 3100 Sulfur in Gasoline Gas Chromatograph. The method is designed to quantify the amount of sulfur in a hydrocarbon steam as a substitute for the ASTM D2622 or D5453-93 method, which can also be used.

The information from the analysis is then fed to a computer 7 which can control the component flows to produce a gasoline blend which complies with a California Predictive Model for the winter season. The information provided to the computer can comprise information from on-line analysis, as well as information from an analysis conducted in a laboratory 8. If desired, tank information and blend specifications for the gasoline in the product tank can also be provided to the computer. Samples can be drawn from the gasoline product tank, for example, at 9, for laboratory testing.

It has been discovered that a gasoline can be economically and feasibly blended, particularly on a continuous basis, using the streams from a refinery, despite variations in those streams, to achieve a blended gasoline meeting the specifications of a California Predictive Model. By eliminating ethers, such as MTBE, the number of gasoline blends possible to meet the predictive model becomes much smaller. This is true whether one eliminates ethers voluntarily in blending a Phase 2 compliant gasoline, or whether one is required to eliminate ethers in blending a Phase 3 compliant gasoline. Moreover, the gasoline compositions of the present invention have an RVP of 7.2 or less, and more preferably 7.0 or less, and generally an octane (R+M)/2 of at least 90, making the blending of such compositions very difficult. Yet, it has been found that the blending system of the present invention can still economically and feasiblely provide such a blended gasoline suitable for the summer season compliant with a California Predictive Model. An example of the reduction in the gasoline blends suitable once MTBE is eliminated, can be better appreciated upon a review of FIGS. 2 and 3. This is true even if ethanol is blended into the gasoline downstream of the refinery.

Figure 2:
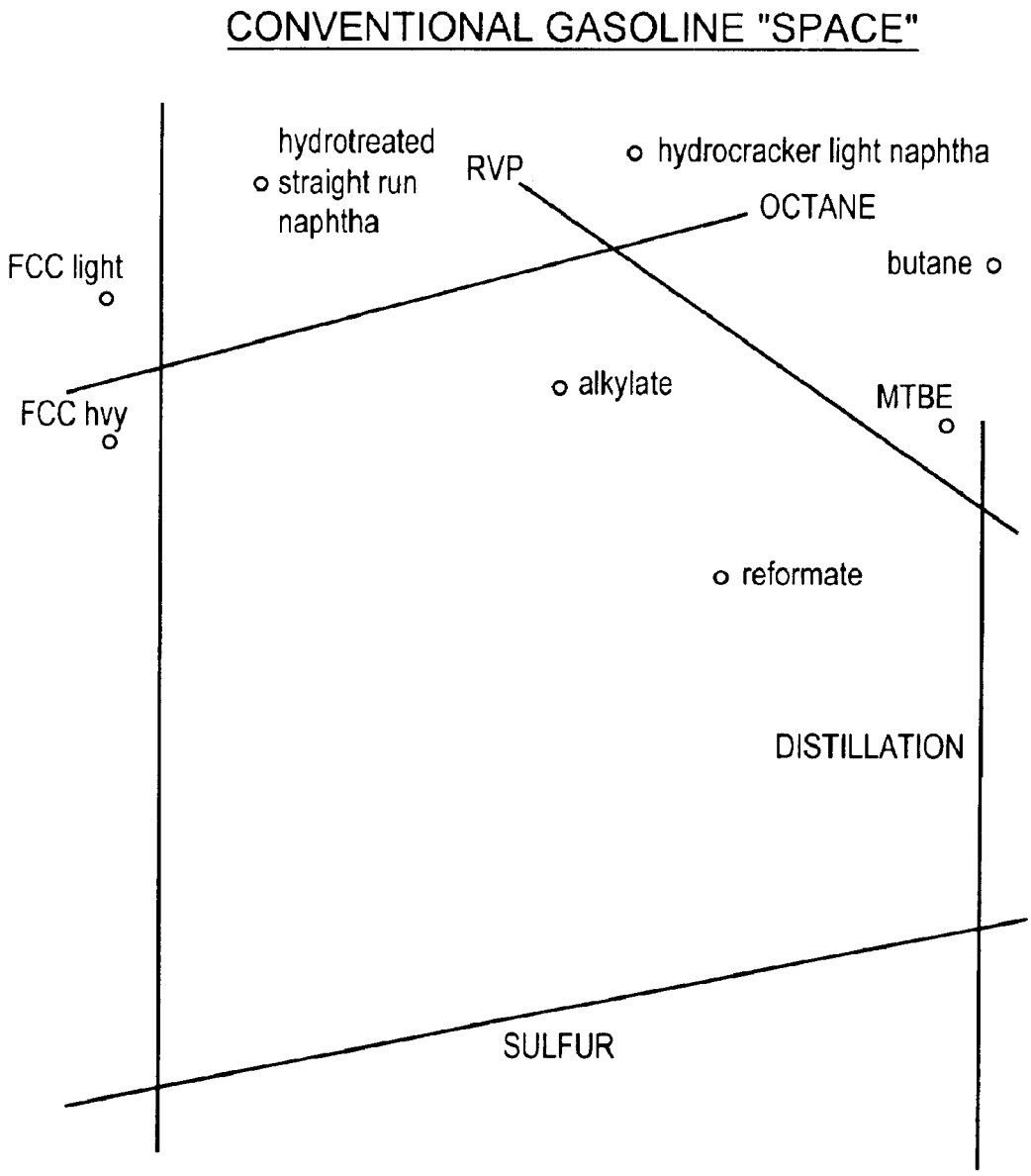
FIG. 2 illustrates the relative number of conventional gasolines that can be blended.
Figure 3:
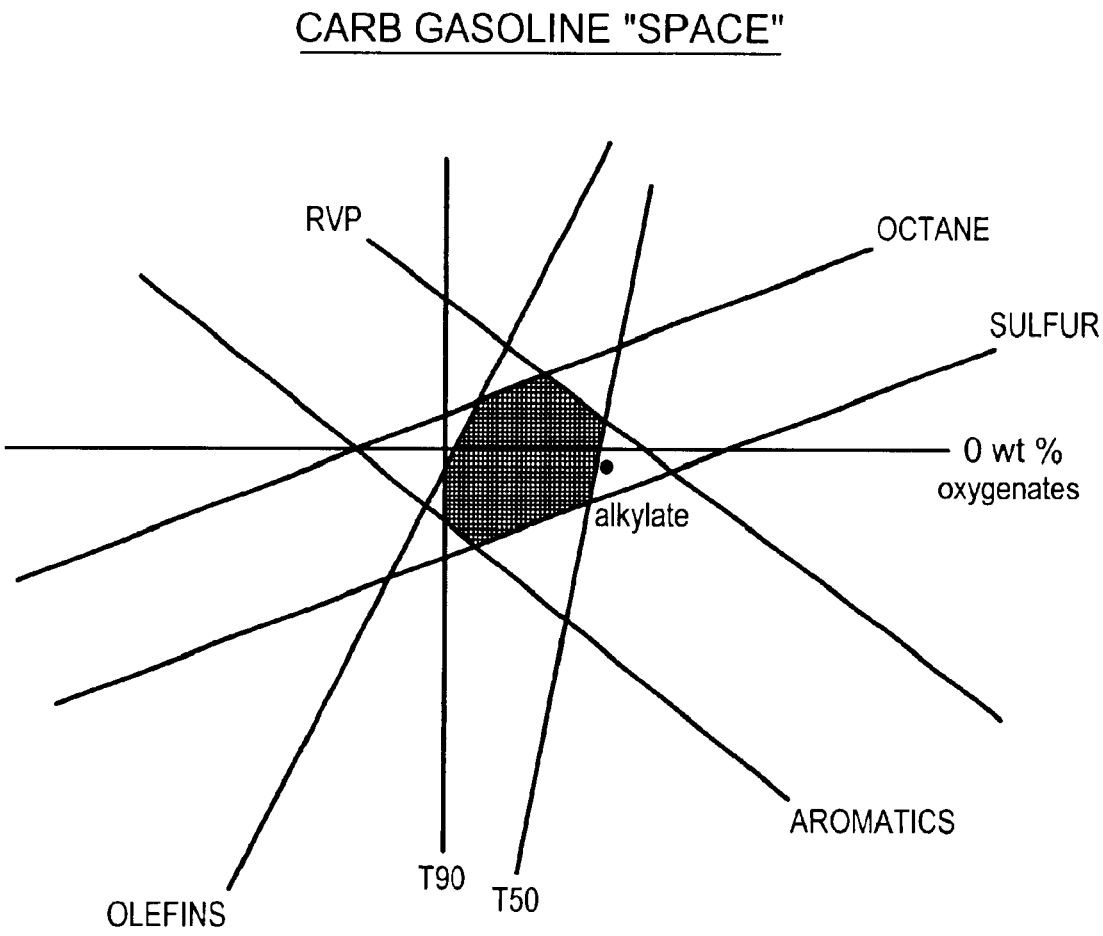
FIG. 3 illustrates the relative number of low-emission gasolines that can be blended when containing ether compounds, and when containing substantially no ether compounds.

In FIG. 2 of the Drawing, the central portion enclosed by the various lines indicates the various gasoline blends that would meet the requirements for conventional gasoline. In FIG. 3, this portion (which indicates the amount of gasoline formulations suitable) is reduced due to the requirements of the California Predictive Model, but the space is still workable. When one requires substantially no ethers, however, the compositions must fall close to the line A shown in FIG. 3, thus, substantially limiting the number of gasoline blends possible.

It has been discovered by the inventors than one can in fact successfully and economically blend an ether free summer grade gasoline compliant with a California Predictive Model. It is preferred, in the blending, that testing occurs to assure that the blending of the gasoline results in a blended gasoline which is compliant with a California Predictive Model, taking into account, if desired, the subsequent blending of ethanol into the gasoline. When ethanol is to be subsequently blended into the gasoline, for example offsite, e.g., at a terminal, then appropriate adjustments in the RVP and the $T_{50}$ must be made. See, U.S. Ser. No. 09/362,242, filed Jul. 28, 1999, which is hereby incorporated by reference in its entirety. It has been discovered that such analysis, particularly when on-line, can quickly result in the necessary adjustments to provide a compliant gasoline, even if adapting for subsequent ethanol blending.

The process of the present invention, therefore, can be used to prepare an economic ether free gasoline which blended gasoline meets the requirements of a California Predictive Model, presently either Phase 2 or Phase 3, and hence the specifications of CARB. The blended gasoline is economic in that it involves the blending of component streams received directly from a refinery, yet the gasoline also contains substantially no ether compounds.

The present invention will be further illustrated by the following Example, which is provided purely for illustration and is not meant to be unduly limiting. Where percentages are mentioned in the following Example, and throughout the specification, the parts and percentages are by weight unless otherwise specified.

EXAMPLE

A blended gasoline was made using the blending system depicted in FIG. 1, with an on-line analyzer. The blended gasoline is deemed to be in compliance with the Phase 2 or Phase 3 California Predictive Model.

The various component streams used were conventional gasoline component streams including:

(i) light petroleum-butane/pentane;

(ii) pentane/hexane;

(iii) hydrobate (reformer feed);

(iv) reformate;

(v) FCC gasoline;

(vi) alkylate;

(vii) toluene.

All of the foregoing component streams were provided from the same refinery. However, any one of the streams used, and particularly toluene, can be provided from an outside source, but it is preferred for the present invention that the component streams originate as streams in the refinery on site.

Provided below are the qualities of the gasoline successfully blended in accordance with the present invention. The example demonstrates that such gasoline, suitable as high octane summer gasoline, can be successfully blended using gasoline component streams from a refinery so as to comply with the California Predictive Model, yet contain substantially no ethers.

| Blend Qualities | Example |
|---|---|
| RON | 95.6 |
| MON | 88.5 |
| (R + M)/2 | 92.0 |
| RVP psi | 6.83 |
| Oxygen, wt % | 0.0 |
| Gravity API | |
| Aromatics LV % | 13.6 |
| Olefins LV % | 6.2 |
| Benzene LV % | 0.5 |
| Sulfur, ppm | 23 |
| D-86 10 F | 143 |
| D-86 50 F | 208 |
| D-86 90 F | 246 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method of blending unleaded gasolines which are substantially free of ethers, which have an octane number of at least 90 (R+M)/2, and which have a Reid vapor pressure of 7.00 or less, which method comprises (a) blending some or all gasoline component streams from an oil refinery and keeping the blend substantially free of ether compounds, and with a sulfur content of less than 10 ppmw sulfur, and (b) controlling the blending of the streams such that the blended unleaded gasoline is in compliance with a California Predictive Model.

2. The method of claim 1, wherein the blending of the streams from an oil refinery is on a continuous basis.

3. The method of claim 1, wherein testing of the blended unleaded gasoline is conducted for compliance with the California Phase 2 or Phase 3 Predictive Model, and necessary adjustments in the blends based on the results of the testing are made to maintain compliance with the California Phase 2 or Phase 3 Predictive Model.

4. The method of claim 3, wherein the testing is conducted on a continuous basis.

5. The method of claim 3, wherein the testing is conducted on a periodic basis.

6. The method of claim 2, wherein testing of the blended unleaded gasoline is conducted for compliance with the California Phase 2 or Phase 3 Predictive Model, and necessary adjustments in the blends based on the results of the testing are made to maintain compliance with the California Phase 2 or Phase 3 Predictive Model.

7. The method of claim 1, wherein the streams are blended such that the blended gasoline has an octane of at least 91 (R+M)/2.

8. The method of claim 1, wherein the streams are blended such that the blended gasoline has an octane of at least 92 (R+M)/2.

9. The method of claim 1, wherein the streams are blended such that the blended gasoline has an octane of at least 93 (R+M)/2.

10. The method of claim 1, wherein the streams are blended such that the blended gasoline is in compliance with the flat specification compliance option of CARB.

11. The method of claim 1, wherein the streams are blended such that the blended gasoline is in compliance with the averaging specification compliance option of CARB.

12. The method of claim 1, wherein the streams blended result in a blended gasoline having oxygen attributable to ether of less than 0.5 wt. %.

13. The method of claim 1, wherein the streams blended are blended such that the resulting blended gasoline contains oxygen attributable to ethers of less than 0.1 wt. %.

14. The method of claim 1, wherein the streams are blended such that the blended gasoline contains oxygen attributable to ethers of less than 0.05 wt. %.

15. The method of claim 1, wherein the blended gasoline contains less than 5 ppm wt. sulfur.

16. The method of claim 1, wherein the streams are blended such that the blended gasoline contains less than 8 vol. % olefins.

17. The method of claim 16, wherein the blended gasoline contains less than 6 vol. % olefins.

18. The method of claim 16, wherein the blended gasoline contains less than 3 vol. % olefins.

19. The method of claim 1, wherein the streams are blended such that the blended gasoline exhibits a $T_{50}$ of less than 203° F.

20. The method of claim 19, wherein the blended gasoline exhibits a $T_{50}$ of less than 200° F.

21. The method of claim 19, wherein the blended gasoline exhibits a $T_{50}$ of less than 190° F.

22. The method of claim 1, when the streams are blended such that the blended gasoline contains less than 0.5 vol. % benzene.

23. A blended gasoline composition prepared by the method of claim 1.

24. The gasoline composition of claim 23, wherein the blended gasoline composition has an octane of at least 91 (R+M)/2.

25. The gasoline composition of claim 23, wherein the composition has an octane from of at least 92 (R+M)/2.

26. The gasoline composition of claim 23, wherein the gasoline has an octane of at least 93 (R+M)/2.

27. The gasoline composition of claim 23, wherein the composition contains oxygen attributable to ethers in an amount less than 0.5 wt. %.

28. The gasoline composition of claim 23, wherein the composition contains oxygen attributable to ethers in an amount less than 0.1 wt. %.

29. The gasoline composition of claim 23, wherein the composition contains oxygen attributable to ethers in an amount less than 0.05 wt. %.

30. The gasoline composition of claim 23, wherein the composition contains less than 5 ppm wt. sulfur.

31. The gasoline composition of claim 23, wherein the composition contains less than 8 vol. % olefins.

32. The gasoline composition of claim 23, wherein the composition contains less than 6 vol. % olefins.

33. The gasoline composition of claim 23, wherein the composition contains less than 3 vol. % olefins.

34. The gasoline composition of claim 23, wherein the composition exhibits a $T_{50}$ of less than 203° F.

35. The gasoline composition of claim 23, wherein the composition exhibits a $T_{50}$ of less than 200° F.

36. The gasoline composition of claim 23, wherein the composition exhibits a $T_{50}$ of less than 190° F.

37. The gasoline composition of claim 23, wherein the composition less than 0.5 vol. % benzene.

38. A gasoline composite which is substantially free of oxygenates, is in compliance with the California Predictive Model, has an octane number of at least 90 (R+M)/2, and a sulfur content of less than 10 ppmw sulfur.

39. The method of claim 1, wherein ethanol is blended with the gasoline.

40. The method of claim 1, wherein ethanol is blended with the gasoline at a different site.

41. The method of claim 40, wherein the ethanol is blended at a terminal site.

* * * * *